May 5, 1931.  J. H. JOHNSON  1,803,330
FOOD PRESERVING TABLE
Filed March 9, 1928
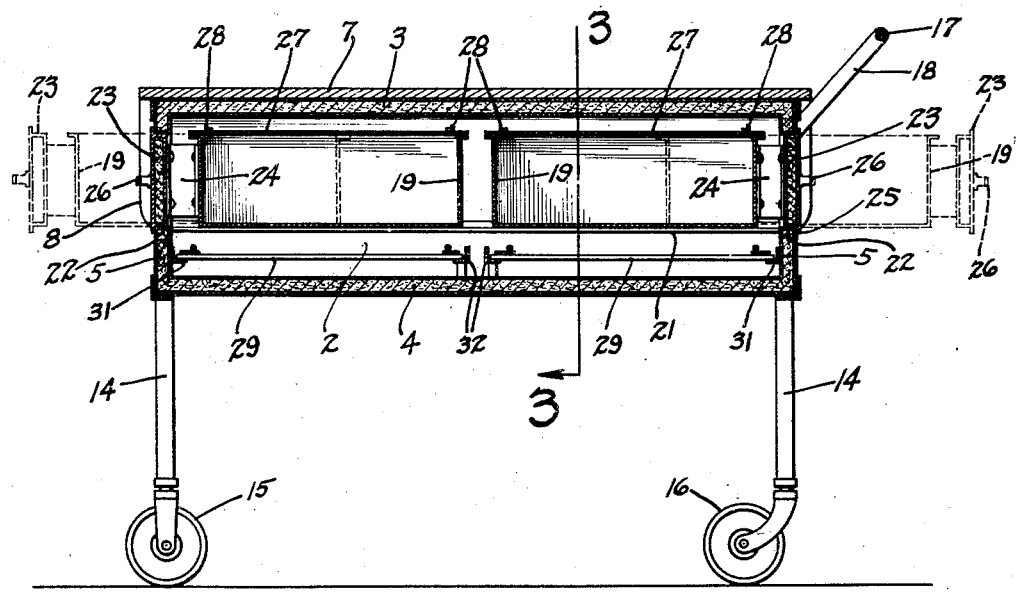
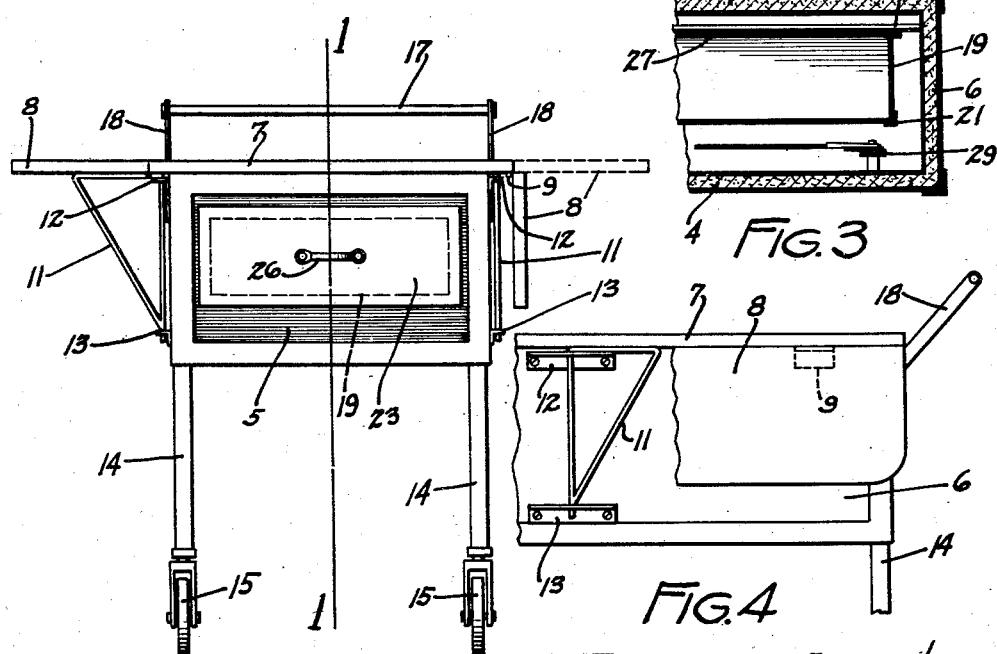
Inventor
JOHN H. JOHNSON
By
ATTORNEYS Patented May 5, 1931

1,803,330

UNITED STATES PATENT OFFICE

JOHN H. JOHNSON, OF CHULA VISTA, CALIFORNIA

FOOD-PRESERVING TABLE

Application filed March 9, 1928. Serial No. 260,529.

This invention relates to an improved food-preserving table, particularly adapted for use in hotels, hospitals, and similar places, to convey prepared food from the kitchen to rooms in such institutions, for the convenience of the guests and inmates.

An object of the invention is to provide a food-preserving table comprising a chamber having insulating walls, and a drawer mounted in the chamber and spaced from the walls thereof to provide air-circulation passages around the drawer, and a suitable heater being provided in the bottom of the chamber for heating the latter.

A further object is to provide a portable food-preserving and conveying table, comprising a heated chamber having insulating walls and drawers mounted therein and spaced from the walls of the chamber to form air-circulation passages around and between the drawers, and each drawer having a cover fixed in the chamber to provide a closure therefor, when the drawers are in normal position within the chamber, thereby preventing the escape of moisture from the food contained in the drawers, with the result that the food may be kept in a heated state for a comparatively long time so that it may be served to the guests in their hotel rooms, the table serving as a means for supporting the food while being consumed, as well as providing a storage chamber for the prepared food, prior to being served to the guests.

Features of the invention reside in the portability of the table; the hinged top sections for enlarging the table top and which permits the table to pass through ordinary doorways, when the sections are folded; in the particular arrangement of the drawers, whereby each drawer may be conveniently operated from its respective end of the table; and, in the general construction of the table, as a whole.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 1 is a cross sectional view on the line 1—1 of Figure 2, showing in full lines the drawers positioned within the chamber and the dotted lines indicating the drawers positioned to permit the removal of food therefrom;

Figure 2 is an end view of Figure 1;

Figure 3 is a detailed sectional view on the line 3—3 of Figure 1, showing the supporting means for the drawers and covers; and Figure 4 is a side elevation of a portion of the table showing the means provided for supporting the hinged top sections in operative positions.

The novel food-preserving and conveying table featured in this invention comprises a chamber 2, defined by the top wall 3, bottom wall 4, end walls 5 and the side walls 6, all of suitable insulating material.

A suitable table top 7 is secured to the top wall 3 of the chamber 2, and is provided at each side with a hinged section 8, hinged to the top 7 by suitable hinges 9, indicated in dotted lines in Figure 4. The hinged sections 8 are adapted to be retained in operative position as shown at the left hand side of Figure 2, by means of brackets 11 pivotally supported in angle iron brackets 12 and 13, secured to the side walls 6 of the chamber.

The table is supported upon suitable legs 14 provided with suitable castors 15 and 16, the latter being swiveled to permit turning movement of the table. A handle 17 is provided at one end of the table for conveniently moving the table from place to place. This handle is supported upon arms 18, preferably pivotally connected with the end wall of the table so that it may be lowered to an inoperative or out-of-the-way position, when food is being served from the table.

In this instance, two drawers 19 are shown, each movably mounted within the chamber 2 upon suitable rails 21, having their opposite ends suitably secured to the end walls 5 of the chamber. These drawers are movable through openings 22 provided in the end walls 5. The end walls of the drawers 19 adjacent to these openings, each have secured thereto an insulating panel 23, by means of suitable spacing members 24. The construction of the panels 23 is similar to the construction of the insulating walls defining the chamber 2. Each panel has a marginal flange 25 engaged with the exterior surfaces of the end walls 5 to prevent the escape of heat between the edges of the panels 23 and openings 22. Each panel further is provided with a handle 26 by means of which it may readily be moved into and out of the compartment 2. Plates 27 are suitably secured in the chamber 2 by means of angle irons 28, having their ends suitably secured to the inner surfaces of the side walls 6. These plates 27 provide covers or closures for the drawers 19, when positioned as shown in full lines in Figure 1.

The means provided for heating the chamber 2 is shown in Figure 1, and preferably consists of electric heating elements 29 spaced from the bottom wall 4 of the chamber and supported upon suitable angles 31 and 32, as shown in Figure 1.

I claim as my invention:

1. A portable service table including an elongated body portion having a chamber therein defined by insulated walls and the end walls of said chamber each having a door opening provided with a door, spaced rails in said chamber extending lengthwise thereof, a pair of drawers slidably supported on said rails and movable through said door openings, each drawer being secured to one of said doors and spaced therefrom to provide air-circulation passages between the drawers and their respective doors, plates fixed in said chamber and arranged to provide closures for said drawers when the drawers are positioned in said chamber, and said plates and the walls of said drawers being spaced from the walls of said chamber to provide air-circulation passages around the sides, ends, tops, and bottoms of said drawers, and means for heating said chamber.

2. A portable service table including an elongated body portion having a chamber therein defined by insulated walls and the end walls of said chamber each having a door opening provided with a door, spaced rails in said chamber extending lengthwise thereof, a pair of drawers slidably supported on said rails and movable through said door openings, each drawer being secured to one of said doors and spaced therefrom to provide air-circulation passages between the drawers and their respective doors, and the inner end walls of said drawers being spaced apart when said drawers are in normal concealed position, plates fixed in said chamber and arranged to provide closures for said drawers when the drawers are positioned in said chamber, said plates and the walls of said drawers being spaced from the walls of said chamber to provide air-circulation passages around the sides, ends, tops, and bottoms of said drawers.

In witness whereof, I have hereunto set my hand this 5th day of March, 1928.

JOHN H. JOHNSON.